(12) United States Patent
Rudnick et al.

(10) Patent No.: US 12,222,473 B2
(45) Date of Patent: Feb. 11, 2025

(54) LOW TOTAL TRACK LENGTH LENS ASSEMBLY INCLUDING SEVEN LENSES OF +−+−++− REFRACTIVE POWERS FOR LARGE SENSOR FORMAT

(71) Applicant: Corephotonics Ltd., Tel Aviv (IL)

(72) Inventors: Roy Rudnick, Tel Aviv (IL); Michael Dror, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/645,450

(22) Filed: Apr. 25, 2024

(65) Prior Publication Data

US 2024/0329365 A1 Oct. 3, 2024

Related U.S. Application Data

(63) Continuation of application No. 18/314,936, filed on May 10, 2023, now Pat. No. 12,000,996, which is a continuation of application No. 17/261,110, filed as application No. PCT/IB2020/056923 on Jul. 22, 2020, now Pat. No. 11,668,910.

(60) Provisional application No. 62/889,633, filed on Aug. 21, 2019.

(51) Int. Cl.
  *G02B 13/00* (2006.01)
  *G02B 9/64* (2006.01)

(52) U.S. Cl.
  CPC ........... *G02B 13/0045* (2013.01); *G02B 9/64* (2013.01)

(58) Field of Classification Search
  CPC ............................. G02B 13/0045; G02B 9/64
  See application file for complete search history.

(56) References Cited

U.S. PATENT DOCUMENTS

| | | | |
|---|---|---|---|
| 2,106,752 | A | 2/1938 | Land |
| 2,354,503 | A | 7/1944 | Arthur |
| 2,378,170 | A | 6/1945 | Aklin |
| 2,441,093 | A | 5/1948 | Aklin |
| 3,388,956 | A | 6/1968 | Eggert et al. |
| 3,524,700 | A | 8/1970 | Eggert et al. |
| 3,558,218 | A | 1/1971 | Grey |

(Continued)

FOREIGN PATENT DOCUMENTS

| | | |
|---|---|---|
| CN | 101634738 A | 1/2010 |
| CN | 102147519 A | 8/2011 |

(Continued)

OTHER PUBLICATIONS

A compact and cost effective design for cell phone zoom lens, Chang et al., Sep. 2007, 8 pages.

(Continued)

*Primary Examiner* — Wen Huang
(74) *Attorney, Agent, or Firm* — Nathan & Associates; Menachem Nathan

(57) ABSTRACT

Lens assemblies comprising from an object side to an image side, seven lens elements numbered L1-L7; an optical window; and an image sensor having a sensor diagonal length (SDL), wherein an exemplary lens assembly has a total track length TTL that includes the optical window an effective focal length EFL and a field of view (FOV), wherein TTL/EFL<1.100, wherein TTL/SDL<0.64, wherein FOV<90 degrees, wherein a normalized thickness standard deviation constant T_STD of at least four of the seven lens elements complies with T_STD<0.035, and wherein a focal length $f_1$ of lens element L1 fulfills $f_1$/EFL<0.95.

18 Claims, 5 Drawing Sheets

(56) References Cited

U.S. PATENT DOCUMENTS

| | | |
|---|---|---|
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Lyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,869,846 B1 | 1/2018 | Bone et al. |
| 2002/0118471 A1 | 8/2002 | Imoto |
| 2003/0048542 A1 | 3/2003 | Enomoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0275025 A1 | 12/2006 | Labaziewicz et al. |
| 2007/0114990 A1 | 5/2007 | Godkin |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2009/0279191 A1 | 11/2009 | Yu |
| 2009/0303620 A1 | 12/2009 | Abe et al. |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |

(56) References Cited

U.S. PATENT DOCUMENTS

| | | |
|---|---|---|
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park, II |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 2000292848 A | 10/2000 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019113878 A | 7/2019 |
| KR | 20080088477 A | 10/2008 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |
| WO | 2013058111 A1 | 4/2013 |
| WO | 2013063097 A1 | 5/2013 |
| WO | 2018130898 A1 | 7/2018 |

OTHER PUBLICATIONS

Consumer Electronic Optics: How small a lens can be? The case of panomorph lenses, Thibault et al., Sep. 2014, 7 pages.

(56) References Cited

OTHER PUBLICATIONS

Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.

LOW TOTAL TRACK LENGTH LENS ASSEMBLY INCLUDING SEVEN LENSES OF +−+−++− REFRACTIVE POWERS FOR LARGE SENSOR FORMAT

CROSS REFERENCE TO RELATED APPLICATIONS

This is a continuation of U.S. patent application Ser. No. 18/314,936 filed May 10, 2023 (now allowed), which was a continuation of U.S. patent application Ser. No. 17/261,110 filed Jan. 18, 2021 (now U.S. Pat. No. 11,668,910), which was a 371 application from international patent application PCT/IB2020/056923 filed Jul. 22, 2020, which claims the benefit of priority from U.S. provisional patent application No. 62/889,633 filed Aug. 21, 2019, which is incorporated herein by reference in its entirety.

FIELD

Embodiments disclosed herein relate to optical lenses, and more particularly, to miniature lens assemblies.

BACKGROUND

Digital camera modules are now standard in a variety of host devices. Such host devices include cellular telephones (smartphones), personal data assistants (PDAs), computers, and so forth. Cameras in smartphones in particular require a compact imaging lens system for good quality imaging and with a small total track length (TTL) relative to the size of the image sensor in such cameras. The image sensor size can always be expressed by the sensor diagonal, SDL.

SUMMARY

In various exemplary embodiments, there are disclosed lens assemblies comprising: from an object side to an image side, seven lens elements numbered L1-L7, an optical window and an image sensor having a sensor diagonal length (SDL), wherein an exemplary lens assembly has a total track length TTL that includes the optical window, an effective focal length (EFL) and a field of view (FOV), wherein TTL/EFL<1.100, wherein TTL/SDL<0.64, wherein FOV<90 degrees, wherein a normalized thickness standard deviation constant T_STD of at least four of the seven lens elements complies with T_STD<0.035, and wherein a focal length $f_1$ of lens element L1 fulfills $f_1$/EFL<0.95.

In an embodiment, D/2 is an aperture radius and wherein a sign of z(r) from z(0.85*D/2) to z(D/2) is positive for surfaces $LO_1$, $LI_1$ of L1 and surfaces $LO_2$, $LI_2$ of L2, and negative for surfaces $LO_4$, $LI_4$ of L4, $LO_5$, $LI_5$ of L5 $LO_6$, $LI_6$ of L6 and $LO_7$, $LI_7$ of L7.

In some embodiments, ach element has a clear aperture (CA) and wherein a CA of lens elements L3 or L4 is the smallest of all CAs in the lens assembly.

In some embodiments, TTL/EFL<1.090.
In some embodiments, TTL/EFL<1.083.
In some embodiments, TTL/SDL<0.63.
In some embodiments, TTL/SDL<0.61.
In some embodiments, lens element L1 is convex on the object side.
In some embodiments, the lens elements have, starting with lens element L1, a power sign sequence of positive-negative-positive-negative-positive-positive-negative.
In some embodiments, the CT of at least 6 of the 7 lens elements complies CT/TTL<0.07.

In some embodiments, the T_STD of at least 5 of the 7 lens elements complies with T_STD<0.06.
In some embodiments, the T_STD of at least 5 of the 7 lens elements complies with T_STD<0.05.
In some embodiments, $f_1$/EFL<0.9.
In some embodiments, $f_1$/EFL<0.85;
In some embodiments, a focal length $f_5$ of lens element L5 fulfills $|f_5/EFL|>4.0$.
In some embodiments, focal length $f_5$ of lens element L5 fulfills $|f_5/EFL|>6.0$.
In some embodiments, focal length $f_5$ of lens element L5 fulfills $|f_5/EFL|>8.0$.
In some embodiments, a focal length $f_6$ of lens element L6 fulfills $f_6/EFL|>15.0$.
In some embodiments, a focal length $f_6$ of lens element L6 fulfills $f_6/EFL|>30.0$.
In some embodiments, a focal length $f_6$ of lens element L6 fulfills $f_6/EFL|>45.0$.
In some embodiments, a normalized gap standard deviation constant G_STD of a gap between lens elements L1 and L2 complies with G_STD<0.006.
In some embodiments, a normalized gap standard deviation constant G_STD of a gap between lens elements L1 and L2 complies with G_STD<0.01.
In some embodiments, a normalized gap standard deviation constant G_STD of a gap between lens elements L1 and L2 complies with G_STD<0.007.
In some embodiments, SDL=12 mm and FOV<82.1 degrees.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein and should not be considered limiting in any way. In the drawings.

DETAILED DESCRIPTION

Figure 1:
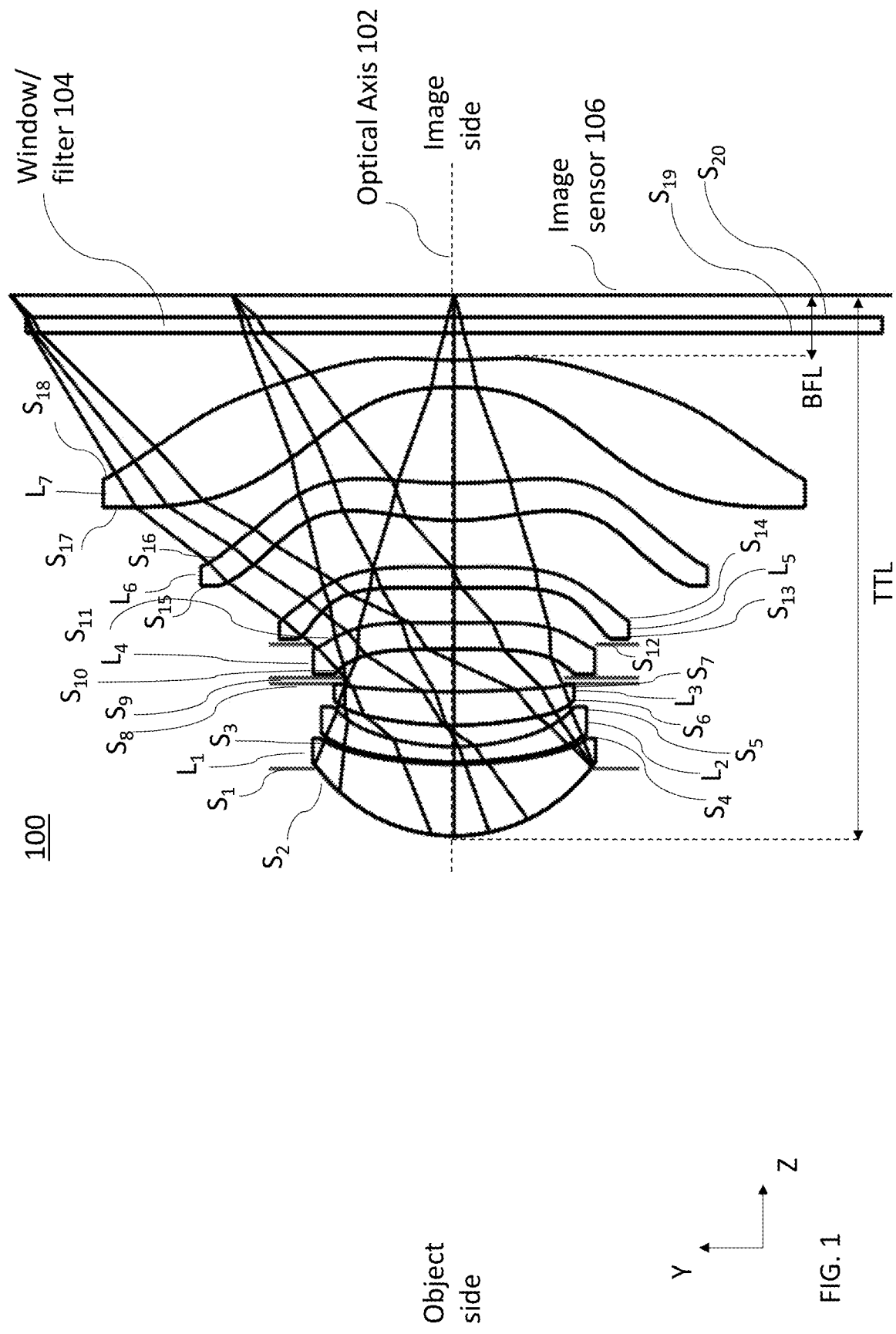
FIG. 1 shows an exemplary embodiment of a lens assembly disclosed herein.

FIG. 1 shows an embodiment of an optical lens system disclosed herein and numbered 100. Embodiment 100 comprises in order from an object side to an image side a plurality of lens elements (here exemplarily seven lens elements numbered L1-L7) with a common optical axis 102. The lens further comprises three aperture stops marked S1 and two blocking surfaces S8 and S9. Lens element surfaces are marked "Si", with S2 marking an object side surface of first lens element L1 and S18 marking an image side of lens element L7. Lens 100 further comprises an optional glass window 104 disposed between surface S18 and an image sensor 106 for image formation of an object. Image sensor 106 has a size characterized by an image sensor diagonal SDL.

The TTL is defined as the distance from the $S_1$ to the image sensor. FIG. 1 also shows a back focal length (BFL), defined as the distance from the last surface of the last lens element $S_{2N}$ to the image sensor.

For convenience in some equations and relations presented below, lens element surfaces are also marked "$LO_i$" on the object side surface of lens element number i and "$LI_i$" on the image side surface of lens element number i.

Surface Types

Surface types are defined in Table 1 and the coefficients for the surfaces are in Table 2:

a) Plano: flat surfaces, no curvature
b) Q type 1 (QT1) surface sag formula:

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, \quad x = u^2$$

$Q_0^{con}(x) = 1 \quad Q_1^{con} = -(5 - 6x) \quad Q_2^{con} = 15 - 14x(3 - 2x)$ $Q_3^{con} = -\{35 - 12x[14 - x(21 - 10x)]\}$ $Q_4^{con} = 70 - 3x\{168 - 5x[84 - 11x(8 - 3x)]\}$ $Q_5^{con} = -[126 - x(1260 - 11x\{420 - x[720 - 13x(45 - 14x)]\})]$ where $\{z, r\}$ are the standard cylindrical polar coordinates, c is the paraxial curvature of the surface, k is the conic parameter, $r_{norm}$ is generally one half of the surface's clear aperture, and $A_n$ are the polynomial coefficients shown in lens data tables. z-axis is positive towards image.

In this specification, the term "$RMO_i$" refers to the aperture radius of a surface $LO_i$. The term "$RMI_i$" refers to the aperture radius of a surface $LI_i$.

In this specification, the term "normal thickness" (NT) is a function of r marked $NT_i(r)$, and refers to the distance between the two surfaces of a lens element at coordinate r along the normal vector of the surface closer to object. Several functions and constants are defined per normal thickness:

For r=0, $NT_i(r=0)$ is defined as the central thickness (CT) of lens element i ($CT_i$)

A "thickness average" ($T\_AVG_i$) constant is given by:

$$T\_AVG_i = \frac{1}{N} \sum_{k=0}^{N} NT_i\left(\frac{k \cdot RMO_i}{N}\right) \quad \text{(Eq. 2)}$$

where k is a discrete variable that runs from 0 to N, where N is an integer >10 (for this and all other functions and constants below).

A normalized thickness standard deviation ($T\_STD_i$) constant is given by:

$$T\_STD_i = \frac{1}{RMO_i} \sqrt{\frac{1}{N} \sum_{k=0}^{N} \left(NT_i\left(\frac{k \cdot RMO_i}{N}\right) - T\_AVG_i\right)^2} \quad \text{(Eq. 3)}$$

where k is a discrete variable that runs from 0 to N, and where $T\_AVG_i$ is defined as in (Eq.2).

In this specification, a "gap" or an "air gap" refers to the space between consecutive lens elements. Several functions and constants per gap are defined:

A "$Gap_i(r)$" function (for r=0, an "on-axis gap" $OA\_Gap_i$) is defined as the thickness $LI_i$;

$Gap_i(r) = OA\_Gap_i + z(r)$ of $LI_i - z(r)$ of $LO_{i+1}$, where z(r) is it standard polar coordinate z. $OA\_Gap_i(r=0)$ of $LI_i$ is the air thickness which is the air gap for r=0.

A "gap average" ($G\_AVG_i$) constant is given by:

$$G\_AVG_i = \frac{1}{N} \sum_{k=0}^{N} Gap_i\left(\frac{k \cdot Rmin_i}{N}\right) \quad \text{(Eq. 4)}$$

where k is a discrete variable that runs from 0 to N, where N is an integer >10, and where $Rmin_i$ is the minimum aperture radius value of surfaces $\{RMI_i, RMO_{i+1}\}$;

A normalized gap standard deviation ($G\_STD_i$) constant is given by:

TABLE 1

| EFL = 6.75 mm, F# = 1.80, HFOV = 41.0 deg. | | | | | | | | | |
|---|---|---|---|---|---|---|---|---|---|
| Surface # | Comment | Type | Curvature Radius | Central Thickness | Aperture Radius (D/2) | Material | Index | Abbe # | Focal Length f |
| 1 | A.S | Plano | Infinity | −0.908 | 1.880 | | | | |
| 2 | $L_1$ | QT1 | 2.331 | 0.965 | 1.910 | Plastic | 1.54 | 55.9 | 6.55 |
| 3 | | | 5.744 | 0.032 | 1.800 | | | | |
| 4 | $L_2$ | QT1 | 4.828 | 0.208 | 1.790 | Plastic | 1.67 | 19.4 | −13.88 |
| 5 | | | 3.122 | 0.289 | 1.630 | | | | |
| 6 | $L_3$ | QT1 | 5.131 | 0.452 | 1.620 | Plastic | 1.54 | 55.9 | 17.40 |
| 7 | | | 10.834 | 0.110 | 1.530 | | | | |
| 8 | Stop | Plano | Infinity | 0.080 | 1.470 | | | | |
| 9 | Stop | Plano | Infinity | 0.383 | 1.480 | | | | |
| 10 | $L_4$ | QT1 | −725.052 | 0.358 | 1.620 | Plastic | 1.67 | 19.4 | −55.34 |
| 11 | | | 39.028 | −0.290 | 1.900 | | | | |
| 12 | Stop | Plano | Infinity | 0.760 | 1.905 | | | | |
| 13 | $L_5$ | QT1 | 16.247 | 0.281 | 2.150 | Plastic | 1.57 | 37.4 | 308.74 |
| 14 | | | 17.8 | 0.631 | 2.360 | | | | |
| 15 | $L_6$ | QT1 | 3.628 | 0.503 | 3.180 | Plastic | 1.60 | 28.3 | 11.50 |
| 16 | | | 7.205 | 1.295 | 3.420 | | | | |

TABLE 1-continued

EFL = 6.75 mm, F# = 1.80, HFOV = 41.0 deg.

| Surface # | Comment | Type | Curvature Radius | Central Thickness | Aperture Radius (D/2) | Material | Index | Abbe # | Focal Length f |
|---|---|---|---|---|---|---|---|---|---|
| 17 | L$_7$ | QT1 | −4.684 | 0.369 | 4.500 | Plastic | 1.54 | 55.9 | −4.97 |
| 18 |  |  | 6.612 | 0.366 | 4.740 |  |  |  |  |
| 19 | Filter | Plano | Infinity | 0.2100 | 6.600 | Glass | 1.52 | 64.2 |  |
| 20 |  |  | Infinity | 0.3000 | 6.600 |  |  |  |  |
| 21 | Image | Plano | Infinity | — | 6.200 |  |  |  |  |

$$G\_STD_i = \frac{1}{Rmin_i}\sqrt{\frac{1}{N}\sum_{k=0}^{N}\left(Gap_i\left(\frac{k \cdot Rmin_i}{N}\right) - G\_AVG_i\right)^2} \quad \text{(Eq. 5)}$$

and G_AVG$_i$ is defined as in (Eq.4).

*Reference wavelength is 587.6 nm (d − line)* Units are in mm except for index and Abbe #. HFOV indicates half field of view

TABLE 2

| Aspheric Coefficients ||||||
| Surface # | R$_{norm}$ | A4 | A6 | A8 | A10 |
|---|---|---|---|---|---|
| 2 | 1.932 | 9.9940E−03 | −4.7500E−03 | −2.9987E−03 | −9.0698E−04 |
| 3 | 1.932 | 8.7490E−02 | 6.5977E−02 | 2.4979E−02 | 1.6077E−02 |
| 4 | 1.847 | 1.1859E−02 | 6.3506E−02 | 9.9150E−04 | 6.1490E−03 |
| 5 | 1.677 | 5.3358E−02 | 5.0530E−02 | −3.1217E−03 | −1.4993E−03 |
| 6 | 1.666 | 4.9696E−02 | 5.5310E−02 | 1.6953E−02 | 5.2611E−03 |
| 7 | 1.610 | −1.3866E−02 | 2.8507E−02 | 1.4152E−02 | 6.3734E−03 |
| 10 | 1.717 | −4.2084E−01 | −4.7698E−02 | −1.6836E−02 | −9.1824E−03 |
| 11 | 1.972 | −4.8789E−01 | 2.9587E−02 | 2.9227E−02 | 9.8845E−03 |
| 13 | 2.107 | −8.3702E−01 | −4.1159E−02 | 2.3372E−02 | 2.7289E−02 |
| 14 | 2.399 | −1.0545E+00 | 1.1548E−01 | 8.9981E−03 | 4.5560E−03 |
| 15 | 3.049 | −2.8037E+00 | 2.8375E−01 | 5.5647E−02 | −2.1641E−02 |
| 16 | 3.398 | −2.3573E+00 | 3.7757E−01 | 3.7804E−02 | −4.3086E−02 |
| 17 | 4.316 | 6.5309E−01 | 8.4437E−01 | −4.0343E−01 | 1.9637E−01 |
| 18 | 4.670 | −4.2765E+00 | 9.9979E−01 | −3.6429E−01 | 2.0098E−01 |

| Aspheric Coefficients |||||
| Surface # | A12 | A14 | A16 | A18 | A20 |
|---|---|---|---|---|---|
| 2 | −3.3763E−04 | −8.8742E−05 | −5.9283E−05 | 0.0000E+00 | 0.0000E+00 |
| 3 | 5.9956E−03 | 5.5077E−03 | 1.2558E−03 | 0.0000E+00 | 0.0000E+00 |
| 4 | −4.1612E−04 | 2.6196E−03 | 5.9748E−04 | 0.0000E+00 | 0.0000E+00 |
| 5 | −2.6943E−03 | −4.6173E−04 | −1.5513E−04 | 0.0000E+00 | 0.0000E+00 |
| 6 | 1.1659E−03 | 2.5551E−04 | 5.3420E−05 | 0.0000E+00 | 0.0000E+00 |
| 7 | 2.6374E−03 | 8.6554E−04 | 2.1797E−04 | 0.0000E+00 | 0.0000E+00 |
| 10 | −4.7317E−03 | −1.8472E−03 | −4.5679E−04 | 0.0000E+00 | 0.0000E+00 |
| 11 | 1.3992E−03 | −2.7093E−04 | −2.0424E−04 | 0.0000E+00 | 0.0000E+00 |
| 13 | 5.2402E−03 | 9.4540E−04 | 2.0861E−04 | 1.8088E−04 | 0.0000E+00 |
| 14 | −1.0297E−02 | 3.1228E−03 | 4.0339E−03 | 1.4174E−03 | 0.0000E+00 |
| 15 | −1.1934E−02 | 2.9700E−03 | 4.8437E−03 | −6.6223E−04 | −6.9121E−04 |
| 16 | 8.4277E−03 | 7.9687E−03 | 3.9145E−03 | −3.9617E−03 | −8.7507E−04 |
| 17 | −6.6969E−02 | 2.4300E−02 | −6.4810E−03 | 1.6529E−03 | −1.0244E−04 |
| 18 | −1.0479E−01 | 3.6269E−02 | −1.0994E−02 | 4.8537E−03 | −4.6735E−04 |

Calculation of T_STD for the Lens Based on the Original Specification:

Using Eq. 2 and Eq. 3, one can calculate the thickness of the lens (NT) in 100 steps (N). The thickness is calculated in each step using the 'SAGG' operand in every iteration. The equation of the thickness using the front and rear sag of every lens and the central thickness (CT) is:

$$NT = CT - \text{front sag} + \text{rear sag}$$

For example, see lens element 7, FIG. 3A. The values of the front and rear sag for lens element 7 are given in Table 3A:

TABLE 3A

|  | front sag | rear sag |
|---|---|---|
| 0 | 0 | 0 |
| 0.01 | −0.0002 | 0.0002 |
| 0.02 | −0.0009 | 0.0006 |
| 0.03 | −0.002 | 0.0014 |
| 0.04 | −0.0035 | 0.0024 |
| 0.05 | −0.0056 | 0.0036 |
| 0.06 | −0.0082 | 0.0051 |
| 0.07 | −0.0113 | 0.0067 |
| 0.08 | −0.0151 | 0.0085 |
| 0.09 | −0.0195 | 0.0104 |
| 0.1 | −0.0246 | 0.0122 |
| 0.11 | −0.0304 | 0.0141 |
| 0.12 | −0.0371 | 0.0158 |

TABLE 3A-continued

| | front sag | rear sag |
|---|---|---|
| 0.13 | −0.0447 | 0.0174 |
| 0.14 | −0.0531 | 0.0188 |
| 0.15 | −0.0626 | 0.0199 |
| 0.16 | −0.073 | 0.0206 |
| 0.17 | −0.0846 | 0.021 |
| 0.18 | −0.0972 | 0.0209 |
| 0.19 | −0.1111 | 0.0203 |
| 0.2 | −0.1261 | 0.0191 |
| 0.21 | −0.1423 | 0.0174 |
| 0.22 | −0.1598 | 0.015 |
| 0.23 | −0.1785 | 0.012 |
| 0.24 | −0.1984 | 0.0083 |
| 0.25 | −0.2196 | 0.0039 |
| 0.26 | −0.242 | −0.0012 |
| 0.27 | −0.2657 | −0.007 |
| 0.28 | −0.2905 | −0.0135 |
| 0.29 | −0.3164 | −0.0207 |
| 0.3 | −0.3434 | −0.0287 |
| 0.31 | −0.3714 | −0.0372 |
| 0.32 | −0.4004 | −0.0464 |
| 0.33 | −0.4303 | −0.0562 |
| 0.34 | −0.461 | −0.0666 |
| 0.35 | −0.4924 | −0.0776 |
| 0.36 | −0.5245 | −0.089 |
| 0.37 | −0.5571 | −0.1009 |
| 0.38 | −0.5902 | −0.1132 |
| 0.39 | −0.6237 | −0.1259 |
| 0.4 | −0.6575 | −0.1389 |
| 0.41 | −0.6915 | −0.1522 |
| 0.42 | −0.7256 | −0.1658 |
| 0.43 | −0.7597 | −0.1796 |
| 0.44 | −0.7938 | −0.1936 |
| 0.45 | −0.8277 | −0.2078 |
| 0.46 | −0.8613 | −0.2221 |
| 0.47 | −0.8946 | −0.2366 |
| 0.48 | −0.9276 | −0.2512 |
| 0.49 | −0.9601 | −0.2659 |
| 0.5 | −0.992 | −0.2807 |
| 0.51 | −1.0234 | −0.2957 |
| 0.52 | −1.0542 | −0.3107 |
| 0.53 | −1.0842 | −0.3259 |
| 0.54 | −1.1135 | −0.3411 |
| 0.55 | −1.1421 | −0.3566 |
| 0.56 | −1.1698 | −0.3722 |
| 0.57 | −1.1966 | −0.3881 |
| 0.58 | −1.2227 | −0.4041 |
| 0.59 | −1.2478 | −0.4205 |
| 0.6 | −1.2719 | −0.4371 |
| 0.61 | −1.2952 | −0.454 |
| 0.62 | −1.3175 | −0.4714 |
| 0.63 | −1.3389 | −0.4891 |
| 0.64 | −1.3594 | −0.5073 |
| 0.65 | −1.3788 | −0.526 |
| 0.66 | −1.3974 | −0.5451 |
| 0.67 | −1.415 | −0.5649 |
| 0.68 | −1.4317 | −0.5852 |
| 0.69 | −1.4475 | −0.6062 |
| 0.7 | −1.4624 | −0.6278 |
| 0.71 | −1.4764 | −0.6501 |
| 0.72 | −1.4895 | −0.6731 |
| 0.73 | −1.5019 | −0.6968 |
| 0.74 | −1.5134 | −0.7213 |
| 0.75 | −1.5242 | −0.7465 |
| 0.76 | −1.5343 | −0.7725 |
| 0.77 | −1.5436 | −0.7991 |
| 0.78 | −1.5522 | −0.8265 |
| 0.79 | −1.5603 | −0.8545 |
| 0.8 | −1.5676 | −0.8832 |
| 0.81 | −1.5744 | −0.9125 |
| 0.82 | −1.5807 | −0.9423 |
| 0.83 | −1.5864 | −0.9726 |
| 0.84 | −1.5916 | −1.0032 |
| 0.85 | −1.5964 | −1.0342 |
| 0.86 | −1.6006 | −1.0653 |
| 0.87 | −1.6045 | −1.0965 |
| 0.88 | −1.6079 | −1.1277 |
| 0.89 | −1.611 | −1.1589 |
| 0.9 | −1.6136 | −1.1898 |
| 0.91 | −1.6158 | −1.2205 |
| 0.92 | −1.6177 | −1.2509 |
| 0.93 | −1.6192 | −1.2809 |
| 0.94 | −1.6202 | −1.3105 |
| 0.95 | −1.6208 | −1.3398 |
| 0.96 | −1.6209 | −1.3686 |
| 0.97 | −1.6205 | −1.3972 |
| 0.98 | −1.6198 | −1.4256 |
| 0.99 | −1.6191 | −1.4537 |
| 1 | −1.6196 | −1.4817 |

Figure 2A:
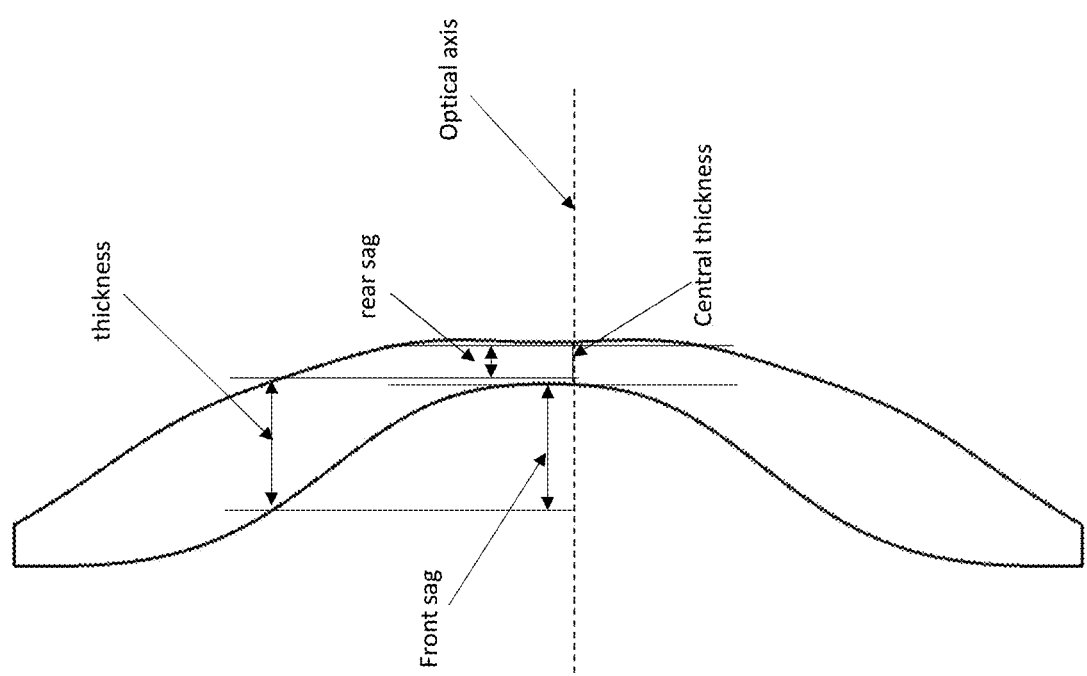
FIG. 2A shows an example for calculation of NT for calculation of T_STD using Eq. 3.
Figure 2B:
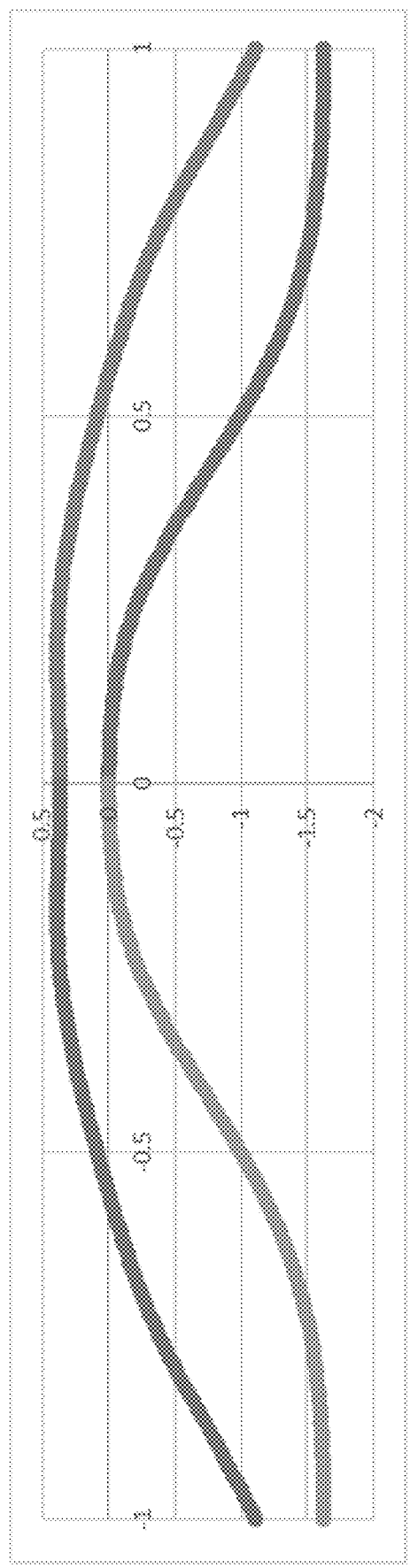
FIG. 2B shows an example of a lens profile obtained using the data in Table 3A.

The central thickness of lens element 7 is 0.3688 mm. From the data, one can plot the lens profile in FIG. 2B. The thickness profile of lens 7 is given in Table 3B:

TABLE 3B

| | |
|---|---|
| 0 | 0.3688 |
| 0.01 | 0.3692 |
| 0.02 | 0.3703 |
| 0.03 | 0.3722 |
| 0.04 | 0.3747 |
| 0.05 | 0.378 |
| 0.06 | 0.3821 |
| 0.07 | 0.3868 |
| 0.08 | 0.3924 |
| 0.09 | 0.3987 |
| 0.1 | 0.4056 |
| 0.11 | 0.4133 |
| 0.12 | 0.4217 |
| 0.13 | 0.4309 |
| 0.14 | 0.4407 |
| 0.15 | 0.4513 |
| 0.16 | 0.4624 |
| 0.17 | 0.4744 |
| 0.18 | 0.4869 |
| 0.19 | 0.5002 |
| 0.2 | 0.514 |
| 0.21 | 0.5285 |
| 0.22 | 0.5436 |
| 0.23 | 0.5593 |
| 0.24 | 0.5755 |
| 0.25 | 0.5923 |
| 0.26 | 0.6096 |
| 0.27 | 0.6275 |
| 0.28 | 0.6458 |
| 0.29 | 0.6645 |
| 0.3 | 0.6835 |
| 0.31 | 0.703 |
| 0.32 | 0.7228 |
| 0.33 | 0.7429 |
| 0.34 | 0.7632 |
| 0.35 | 0.7836 |
| 0.36 | 0.8043 |
| 0.37 | 0.825 |
| 0.38 | 0.8458 |
| 0.39 | 0.8666 |
| 0.4 | 0.8874 |
| 0.41 | 0.9081 |
| 0.42 | 0.9286 |
| 0.43 | 0.9489 |
| 0.44 | 0.969 |
| 0.45 | 0.9887 |
| 0.46 | 1.008 |
| 0.47 | 1.0268 |
| 0.48 | 1.0452 |
| 0.49 | 1.063 |
| 0.5 | 1.0801 |
| 0.51 | 1.0965 |
| 0.52 | 1.1123 |
| 0.53 | 1.1271 |
| 0.54 | 1.1412 |
| 0.55 | 1.1543 |
| 0.56 | 1.1664 |
| 0.57 | 1.1773 |
| 0.58 | 1.1874 |

TABLE 3B-continued

| | |
|---|---|
| 0.59 | 1.1961 |
| 0.6 | 1.2036 |
| 0.61 | 1.21 |
| 0.62 | 1.2149 |
| 0.63 | 1.2186 |
| 0.64 | 1.2209 |
| 0.65 | 1.2216 |
| 0.66 | 1.2211 |
| 0.67 | 1.2189 |
| 0.68 | 1.2153 |
| 0.69 | 1.2101 |
| 0.7 | 1.2034 |
| 0.71 | 1.1951 |
| 0.72 | 1.1852 |
| 0.73 | 1.1739 |
| 0.74 | 1.1609 |
| 0.75 | 1.1465 |
| 0.76 | 1.1306 |
| 0.77 | 1.1133 |
| 0.78 | 1.0945 |
| 0.79 | 1.0746 |
| 0.8 | 1.0532 |
| 0.81 | 1.0307 |
| 0.82 | 1.0072 |
| 0.83 | 0.9826 |
| 0.84 | 0.9572 |
| 0.85 | 0.931 |
| 0.86 | 0.9041 |
| 0.87 | 0.8768 |
| 0.88 | 0.849 |
| 0.89 | 0.8209 |
| 0.9 | 0.7926 |
| 0.91 | 0.7641 |
| 0.92 | 0.7356 |
| 0.93 | 0.7071 |
| 0.94 | 0.6785 |
| 0.95 | 0.6498 |
| 0.96 | 0.6211 |
| 0.97 | 0.5921 |
| 0.98 | 0.563 |
| 0.99 | 0.5342 |
| 1 | 0.5067 |

Then, the average thickness ($T\_AVG_i$) is calculated using Eq. 2 and the normalized standard deviation ($T\_STD_i$) using Eq. 3, where $RMO_i$ refers to the aperture radius of a surface $LO_i$.

Calculation of G_STD for the Lens Based on the Original Specification:

Using Eq. 4 and Eq. 5, one can calculate the thickness of the air gap (Gap) in 100 steps (N). The thickness is calculated in each step using the 'SAGG' operand in every iteration. The equation of the thickness using the front and rear sag of every surface and the central air gap is:

$$Gap = central\ air\ gap - front\ sag + rear\ sag$$

Figure 2C:
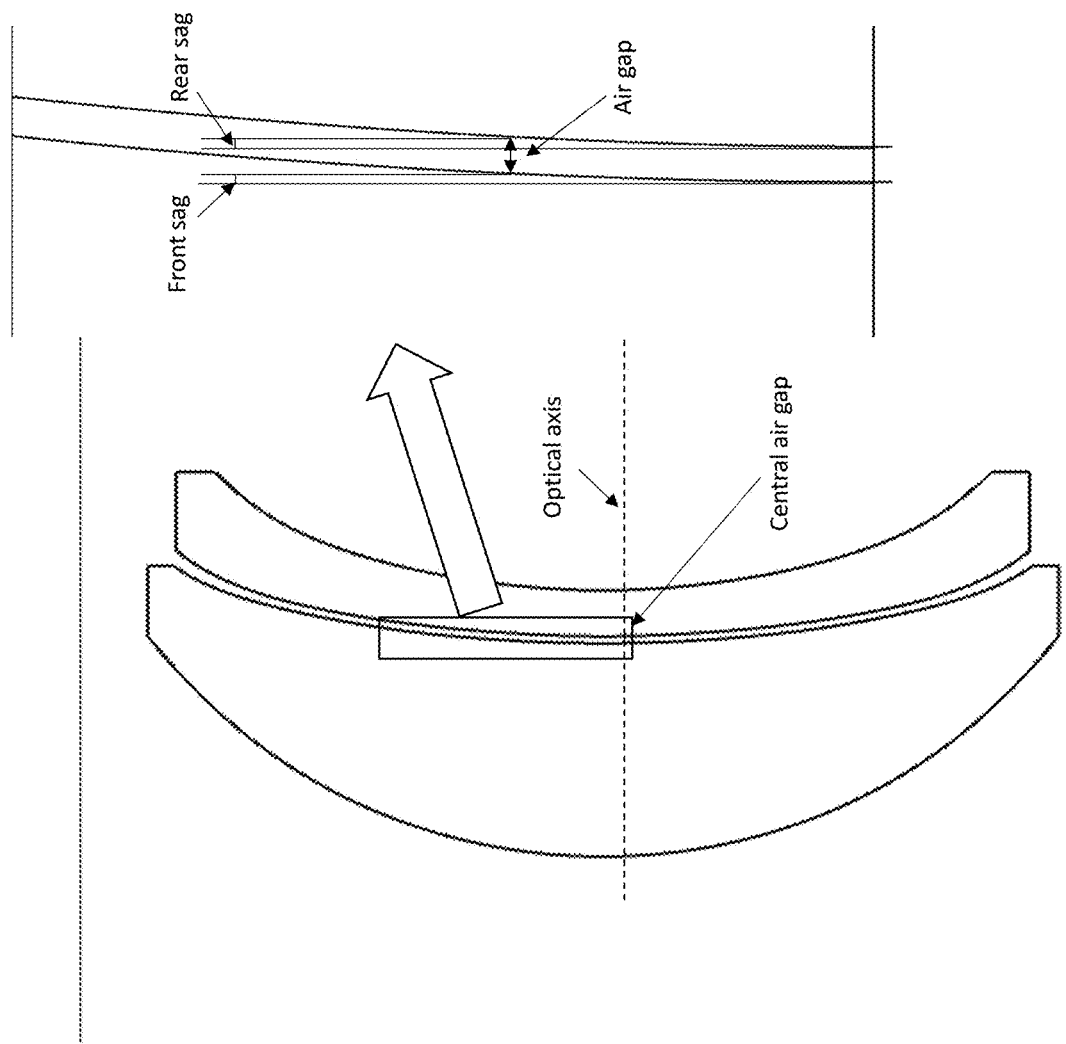
FIG. 2C shows an example for calculation of the gap for calculation of G_STD using Eq. 5.

For example, see the air gap between lens elements 1 and 2 in FIG. 2C. The values of the front and rear sag for air gap between lens elements 1 and 2 are given in Table 3C:

TABLE 3C

| | front sag | rear sag |
|---|---|---|
| 0 | 0 | 0 |
| 0.01 | 0 | 0 |
| 0.02 | 0.0001 | 0.0001 |
| 0.03 | 0.0003 | 0.0003 |
| 0.04 | 0.0004 | 0.0005 |
| 0.05 | 0.0007 | 0.0008 |
| 0.06 | 0.001 | 0.0012 |

TABLE 3C-continued

| | front sag | rear sag |
|---|---|---|
| 0.07 | 0.0014 | 0.0016 |
| 0.08 | 0.0018 | 0.0021 |
| 0.09 | 0.0022 | 0.0026 |
| 0.1 | 0.0028 | 0.0033 |
| 0.11 | 0.0033 | 0.0039 |
| 0.12 | 0.004 | 0.0047 |
| 0.13 | 0.0046 | 0.0054 |
| 0.14 | 0.0054 | 0.0063 |
| 0.15 | 0.0061 | 0.0072 |
| 0.16 | 0.007 | 0.0081 |
| 0.17 | 0.0078 | 0.0091 |
| 0.18 | 0.0088 | 0.0102 |
| 0.19 | 0.0097 | 0.0113 |
| 0.2 | 0.0107 | 0.0124 |
| 0.21 | 0.0118 | 0.0136 |
| 0.22 | 0.0129 | 0.0148 |
| 0.23 | 0.0141 | 0.0161 |
| 0.24 | 0.0153 | 0.0175 |
| 0.25 | 0.0165 | 0.0188 |
| 0.26 | 0.0178 | 0.0202 |
| 0.27 | 0.0192 | 0.0217 |
| 0.28 | 0.0206 | 0.0232 |
| 0.29 | 0.022 | 0.0247 |
| 0.3 | 0.0235 | 0.0263 |
| 0.31 | 0.0251 | 0.028 |
| 0.32 | 0.0267 | 0.0296 |
| 0.33 | 0.0283 | 0.0314 |
| 0.34 | 0.03 | 0.0331 |
| 0.35 | 0.0318 | 0.035 |
| 0.36 | 0.0336 | 0.0368 |
| 0.37 | 0.0355 | 0.0388 |
| 0.38 | 0.0374 | 0.0407 |
| 0.39 | 0.0394 | 0.0428 |
| 0.4 | 0.0414 | 0.0449 |
| 0.41 | 0.0435 | 0.047 |
| 0.42 | 0.0457 | 0.0492 |
| 0.43 | 0.048 | 0.0515 |
| 0.44 | 0.0503 | 0.0538 |
| 0.45 | 0.0527 | 0.0562 |
| 0.46 | 0.0551 | 0.0586 |
| 0.47 | 0.0576 | 0.0612 |
| 0.48 | 0.0602 | 0.0637 |
| 0.49 | 0.0629 | 0.0664 |
| 0.5 | 0.0656 | 0.0691 |
| 0.51 | 0.0684 | 0.0719 |
| 0.52 | 0.0713 | 0.0748 |
| 0.53 | 0.0742 | 0.0777 |
| 0.54 | 0.0772 | 0.0807 |
| 0.55 | 0.0803 | 0.0838 |
| 0.56 | 0.0835 | 0.087 |
| 0.57 | 0.0867 | 0.0902 |
| 0.58 | 0.09 | 0.0935 |
| 0.59 | 0.0933 | 0.0969 |
| 0.6 | 0.0967 | 0.1003 |
| 0.61 | 0.1002 | 0.1039 |
| 0.62 | 0.1038 | 0.1075 |
| 0.63 | 0.1073 | 0.1111 |
| 0.64 | 0.111 | 0.1149 |
| 0.65 | 0.1147 | 0.1187 |
| 0.66 | 0.1185 | 0.1227 |
| 0.67 | 0.1223 | 0.1267 |
| 0.68 | 0.1262 | 0.1308 |
| 0.69 | 0.1302 | 0.135 |
| 0.7 | 0.1343 | 0.1393 |
| 0.71 | 0.1384 | 0.1438 |
| 0.72 | 0.1426 | 0.1483 |
| 0.73 | 0.1469 | 0.153 |
| 0.74 | 0.1512 | 0.1579 |
| 0.75 | 0.1557 | 0.1629 |
| 0.76 | 0.1603 | 0.1681 |
| 0.77 | 0.165 | 0.1735 |
| 0.78 | 0.1699 | 0.1791 |
| 0.79 | 0.1749 | 0.1849 |
| 0.8 | 0.18 | 0.1909 |
| 0.81 | 0.1853 | 0.1972 |
| 0.82 | 0.1908 | 0.2037 |
| 0.83 | 0.1965 | 0.2105 |
| 0.84 | 0.2024 | 0.2176 |

TABLE 3C-continued

|  | front sag | rear sag |
|---|---|---|
| 0.85 | 0.2086 | 0.225 |
| 0.86 | 0.2149 | 0.2328 |
| 0.87 | 0.2215 | 0.2408 |
| 0.88 | 0.2284 | 0.2492 |
| 0.89 | 0.2355 | 0.258 |
| 0.9 | 0.2429 | 0.2671 |
| 0.91 | 0.2507 | 0.2767 |
| 0.92 | 0.2588 | 0.2866 |
| 0.93 | 0.2672 | 0.2971 |
| 0.94 | 0.276 | 0.308 |
| 0.95 | 0.2853 | 0.3194 |
| 0.96 | 0.2951 | 0.3315 |
| 0.97 | 0.3056 | 0.3443 |
| 0.98 | 0.3168 | 0.3579 |
| 0.99 | 0.3288 | 0.3726 |
| 1 | 0.3421 | 0.3886 |

Figure 2D:
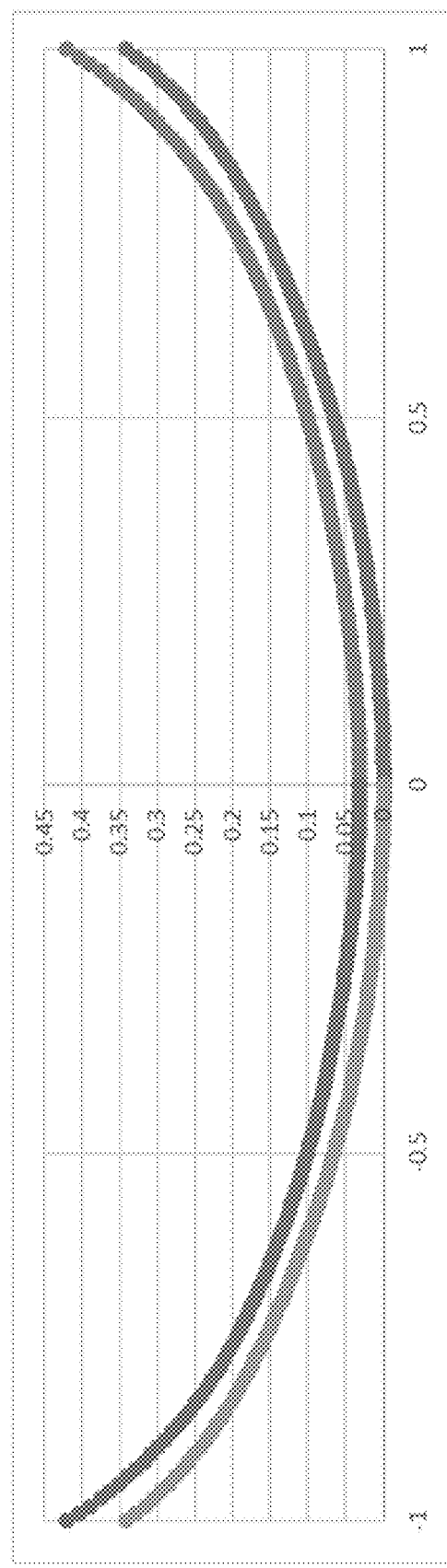
FIG. 2D shows an example of a profile of a gap between lens elements obtained using the data of Table 3C.

The central air gap between lens 1 and lens 2 is 0.0316 mm. From the data, one can then plot the gap profile in FIG. 2D. The air gap thickness profile of air gap between lens 1 and lens 2 is given in Table 3D:

TABLE 3D

| | |
|---|---|
| 0 | 0.0316 |
| 0.01 | 0.0316 |
| 0.02 | 0.0316 |
| 0.03 | 0.0316 |
| 0.04 | 0.0317 |
| 0.05 | 0.0317 |
| 0.06 | 0.0318 |
| 0.07 | 0.0318 |
| 0.08 | 0.0319 |
| 0.09 | 0.032 |
| 0.1 | 0.0321 |
| 0.11 | 0.0322 |
| 0.12 | 0.0323 |
| 0.13 | 0.0324 |
| 0.14 | 0.0325 |
| 0.15 | 0.0327 |
| 0.16 | 0.0327 |
| 0.17 | 0.0329 |
| 0.18 | 0.033 |
| 0.19 | 0.0332 |
| 0.2 | 0.0333 |
| 0.21 | 0.0334 |
| 0.22 | 0.0335 |
| 0.23 | 0.0336 |
| 0.24 | 0.0338 |
| 0.25 | 0.0339 |
| 0.26 | 0.034 |
| 0.27 | 0.0341 |
| 0.28 | 0.0342 |
| 0.29 | 0.0343 |
| 0.3 | 0.0344 |
| 0.31 | 0.0345 |
| 0.32 | 0.0345 |
| 0.33 | 0.0347 |
| 0.34 | 0.0347 |
| 0.35 | 0.0348 |
| 0.36 | 0.0348 |
| 0.37 | 0.0349 |
| 0.38 | 0.0349 |
| 0.39 | 0.035 |
| 0.4 | 0.0351 |
| 0.41 | 0.0351 |
| 0.42 | 0.0351 |
| 0.43 | 0.0351 |
| 0.44 | 0.0351 |
| 0.45 | 0.0351 |
| 0.46 | 0.0351 |
| 0.47 | 0.0352 |
| 0.48 | 0.0351 |
| 0.49 | 0.0351 |
| 0.5 | 0.0351 |
| 0.51 | 0.0351 |
| 0.52 | 0.0351 |
| 0.53 | 0.0351 |
| 0.54 | 0.0351 |
| 0.55 | 0.0351 |
| 0.56 | 0.0351 |
| 0.57 | 0.0351 |
| 0.58 | 0.0351 |
| 0.59 | 0.0352 |
| 0.6 | 0.0352 |
| 0.61 | 0.0353 |
| 0.62 | 0.0353 |
| 0.63 | 0.0354 |
| 0.64 | 0.0355 |
| 0.65 | 0.0356 |
| 0.66 | 0.0358 |
| 0.67 | 0.036 |
| 0.68 | 0.0362 |
| 0.69 | 0.0364 |
| 0.7 | 0.0366 |
| 0.71 | 0.037 |
| 0.72 | 0.0373 |
| 0.73 | 0.0377 |
| 0.74 | 0.0383 |
| 0.75 | 0.0388 |
| 0.76 | 0.0394 |
| 0.77 | 0.0401 |
| 0.78 | 0.0408 |
| 0.79 | 0.0416 |
| 0.8 | 0.0425 |
| 0.81 | 0.0435 |
| 0.82 | 0.0445 |
| 0.83 | 0.0456 |
| 0.84 | 0.0468 |
| 0.85 | 0.048 |
| 0.86 | 0.0495 |
| 0.87 | 0.0509 |
| 0.88 | 0.0524 |
| 0.89 | 0.0541 |
| 0.9 | 0.0558 |
| 0.91 | 0.0576 |
| 0.92 | 0.0594 |
| 0.93 | 0.0615 |
| 0.94 | 0.0636 |
| 0.95 | 0.0657 |
| 0.96 | 0.068 |
| 0.97 | 0.0703 |
| 0.98 | 0.0727 |
| 0.99 | 0.0754 |
| 1 | 0.0781 |

Then, one can calculate the gap average ($G\_AVG_i$) using Eq. 4, and the normalized standard deviation ($G\_STD_i$) using Eq. 5 where $Rmin_i$ is the minimum aperture radius value of surfaces $\{RMI_i, RMO_{i+1}\}$.

Using Eq. 3 and the parameters given in Tables 1 and 2, the following values are calculated for T_STD for lens elements L1 . . . -L7:

| | |
|---|---|
| L1 | 0.086029 |
| L2 | 0.043499 |
| L3 | 0.02944 |
| L4 | 0.019337 |
| L5 | 0.022676 |
| L6 | 0.02971 |
| L7 | 0.064714 |

Using Eq. 5 and the parameters given in Tables 1 and 2, the following values are calculated for G_STD for gaps L1-2 . . . -L6-7:

| | |
|---|---|
| L1-2 | 0.005903 |
| L2-3 | 0.035826 |
| L3-4 | 0.059022 |
| L4-5 | 0.013084 |

-continued

| | |
|---|---|
| L5-6 | 0.076052 |
| L6-7 | 0.259283 |

Table 4 below summarizes the design characteristics and parameters as they appear in the example listed above. These characteristics help to achieve the goal of a compact lens (i.e. small TTL) with a large image height (i.e. large SDL) and small F number (F #):

TABLE 3

"AA": $AA_1 \equiv TTL/EFL < 1.100$, $AA_2 \equiv TTL/EFL < 1.090$, $AA_3 \equiv TTL/EFL < 1.083$;
"BB": $BB_1 \equiv TTL/SDL < 0.64$, $BB_2 \equiv TTL/SDL < 0.63$, $BB_3 \equiv TTL/SDL < 0.61$;
"CC": Lens 1 is convex on object side;
"DD": the CA of Lens 3 or Lens 4 is the smallest of all element CAs;
"EE": power sign sequence: +−+−++−;
"FF": The central thickness (CT) of at least 6 of the 7 lens elements complies with: $FF_1 \equiv CT/TTL < 0.07$;
"GG": The T_STD of at least 5 of the 7 lens elements complies with: $GG_1 \equiv T\_STD/CT < 0.11$, $GG_2 \equiv T\_STD/CT < 0.1$;
"HH": The T_STD of at least 3 of the 7 lens elements complies with: $HH_1 \equiv T\_STD/CT < 0.065$, $HH_2 \equiv T\_STD/CT < 0.05$;
"II": Sign of z(r) from z(0.85*D/2) to z(D/2) is positive for surfaces $LO_1$, $LI_1$, $LO_2$, $LI_2$, and negative for surfaces $LO_4$, $LI_4$, $LO_5$, $LI_5$, $LO_6$, $LI_6$, $LO_7$, $LI_7$;
"JJ": $JJ_1 \equiv f_1/EFL < 0.95$, $JJ_2 \equiv f_1/EFL < 0.9$, $JJ_3 \equiv f_1/EFL < 0.85$;
"KK": $KK_1 \equiv |f_5/EFL| > 4.0$, $KK_2 \equiv |f_5/EFL| > 6.0$, $KK_3 \equiv |f_5/EFL| > 8.0$;
"LL": $LL_1 \equiv |f_6/EFL| > 15.0$, $LL_2 \equiv |f_6/EFL| > 30.0$, $LL_2 \equiv |f_6/EFL| > 45.0$;
"MM": Gap between Lens 1 and Lens 2 that complies with: $MM_1 \equiv G\_STD < 0.015$, $MM_2 \equiv G\_STD < 0.01$ and $MM_3 \equiv G\_STD < 0.007$;
"NN": for the given SDL (12 mm), $0 \leq FOV < 82.1$ degrees.

In summary, various lens assembly embodiments disclosed herein have or fulfill different design characteristics and parameters listed in the Tables above.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

What is claimed is:

1. A lens assembly comprising: from an object side to an image side, seven lens elements numbered L1-L7; an optical window; and an image sensor having a sensor diagonal length SDL, wherein the lens assembly has a total track length TTL, an effective focal length EFL, a field of view FOV<90 degrees and a f number f/#<1.8, wherein TTL/EFL<1.100, wherein TTL/SDL<0.64, wherein a focal length $f_1$ of lens element L1 fulfills $f_1$<EFL, wherein the lens element L1 is convex on the object side, wherein each lens element has a clear aperture CA, and wherein the CA of lens elements L3 or L4 is the smallest of all CAs in the lens assembly.

2. The lens assembly of claim 1, wherein a power sign sequence of the seven lens elements numbered L1-L7 is +−+−++−.

3. The lens assembly of claim 1, wherein TTL/EFL<1.090.

4. The lens assembly of claim 1, wherein TTL/EFL<1.083.

5. The lens assembly of claim 1, wherein TTL/SDL<0.63.

6. The lens assembly of claim 1, wherein TTL/SDL<0.61.

7. The lens assembly of claim 1, wherein each lens element has a respective central thickness CT, and wherein the CT of at least 6 of the 7 lens elements complies CT/TTL<0.07.

8. The lens assembly of claim 1, wherein $f_1$/EFL<0.9.

9. The lens assembly of claim 1, wherein $f_1$/EFL<0.85.

10. The lens assembly of claim 1, wherein a focal length $f_5$ of lens element L5 fulfills $|f_5/EFL|$>4.0.

11. The lens assembly of claim 1, wherein a focal length $f_5$ of lens element L5 fulfills $|f_5/EFL|$>6.0.

12. The lens assembly of claim 1, wherein a focal length $f_5$ of lens element L5 fulfills $|f_5/EFL|$>8.0.

13. The lens assembly of claim 1, wherein a focal length $f_6$ of lens element L6 fulfills $f_6/EFL|$>15.0.

14. The lens assembly of claim 1, wherein a focal length $f_6$ of lens element L6 fulfills $f_6/EFL|$>30.0.

15. The lens assembly of claim 1, wherein a focal length $f_6$ of lens element L6 fulfills $f_6/EFL|$>45.0.

16. The lens assembly of claim 1, wherein SDL=12 mm and wherein FOV<85 degrees.

17. The lens assembly of claim 1, wherein SDL=12 mm and wherein FOV<83 degrees.

18. The lens assembly of claim 1, wherein the lens assembly is included in a smartphone.

* * * * *